United States Patent
Tian et al.

(10) Patent No.: US 8,446,954 B2
(45) Date of Patent: May 21, 2013

(54) MODE SELECTION TECHNIQUES FOR MULTIMEDIA CODING

(75) Inventors: Tao Tian, San Diego, CA (US);
Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1596 days.

(21) Appl. No.: 11/509,214

(22) Filed: Aug. 23, 2006

(65) Prior Publication Data

US 2007/0071105 A1    Mar. 29, 2007

Related U.S. Application Data

(60) Provisional application No. 60/721,418, filed on Sep. 27, 2005.

(51) Int. Cl.
*H04N 7/12* (2006.01)
*H04N 11/02* (2006.01)

(52) U.S. Cl.
USPC ................................. 375/240.13; 375/240.16

(58) Field of Classification Search
USPC ................ 375/240, 240.01–240.26; 348/416, 348/415, 412.1, 384.1, 394.1, 395.1, 400.1, 348/404.1; 382/238, 240, 242, 248, 250
See application file for complete search history.

(56) References Cited

U.S. PATENT DOCUMENTS

| | | | |
|---|---|---|---|
| 6,697,430 B1 * | 2/2004 | Yasunari et al. | 375/240.13 |
| 2005/0175091 A1 | 8/2005 | Puri et al. | |
| 2006/0133511 A1 * | 6/2006 | Chen et al. | 375/240.24 |
| 2011/0274173 A1 * | 11/2011 | Ameres et al. | 375/240.16 |

OTHER PUBLICATIONS

International Search Report and Written Opinion—PCT/US2006/037991, International Search Authority—European Patent Office—May 23, 2007.
Liu Y et al: "Efficient probability based macroblock mode selection in H.264/AVC" Visual Communications and Image Processing; Jul. 12, 2005-Jul. 15, 2005; Beijing Jul. 12, 2005, XP030080950.
Taiwanese Search Report—095135838—TIPO—May 11, 2010.
Yu, Andy C. et al.: "Advanced block size selection algorithm for inter frame coding in H.264/MPEG-4 AVC," Image Processing, 2004. ICIP '04. 2004 International Conference on Singapore Oct. 24-27, 2004, Piscataway, NJ, USA, IEEE, vol. 1 (Oct. 24, 2004), pp. 95-98.

(Continued)

*Primary Examiner* — Behrooz Senfi
(74) *Attorney, Agent, or Firm* — Arent Fox LLP

(57) ABSTRACT

This disclosure describes techniques for improving mode selection decisions during the encoding of macroblocks (or other blocks) of multimedia frames of a multimedia sequence. During motion estimation, the encoding modes for macroblocks can be determined so that a desirable encoding rate and acceptable levels of distortion (i.e., acceptable rate-distortion) can be achieved. The techniques may include selecting a set of multimedia coding modes between at least two sets of possible multimedia coding modes for a macroblock of a multimedia frame based on a detail metric associated with the macroblock and mode information associated with neighboring blocks to the macroblock.

70 Claims, 6 Drawing Sheets

OTHER PUBLICATIONS

Chang, Che-Yu et al.: "Fast mode decision for P frames in H.264," Picture Coding Symposium, [Online] Dec. 15, 2004. URL: http://www.ece.ucdavis.edu/PCS2004/pdf/ID102_revised.pdf.

Girod, Bernd, "The Information Theoretical Significance of Spatial and Temporal Masking in Video Signals," SPIE vol. 1077, Human Vision, Visual Processing, and Digital Display, pp. 178-187 (1989).

Wu, D., et al., "Fast Intermode Decision in H.264/AVC Video Coding," IEEE Transactions on Circuits and Systems for Video Technology, vol. 15, No. 6, pp. 953-958, Jul. 2005.

Jianle, et al., "Variant Bit Rate Control Algorithm for Single-Pass Video Encoding," Journal of Zhejiang University (Engineering Science), Mar. 2005, vol. 39 (3).

* cited by examiner

|    |    |    |
|----|----|----|
| UL | U  | UR |
| L  | C  | R  |
| BL | B  | BR |

FIG. 5

MODE SELECTION TECHNIQUES FOR MULTIMEDIA CODING

CLAIM OF PRIORITY UNDER 35 U.S.C. §119

The present Application for Patent claims priority to Provisional Application No. 60/721,418, entitled FAST INTER MODE DECISION BASED ON HYPOTHESIS TEST, filed Sep. 27, 2005, and assigned to the assignee hereof and hereby expressly incorporated by reference herein.

TECHNICAL FIELD

This disclosure relates to multimedia coding and, more particularly, selection of coding modes for macroblocks within frames of a multimedia sequence.

BACKGROUND

Multimedia capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital multimedia coding can provide significant improvements over conventional analog systems in creating, modifying, transmitting, storing, recording and playing full motion multimedia sequences. Broadcast networks, for example, may use multimedia coding to facilitate the broadcast of one or more channels of multimedia sequences to wireless subscriber devices.

A number of different multimedia coding standards have been established for coding digital multimedia sequences. The Moving Picture Experts Group (MPEG), for example, has developed a number of standards including MPEG-1, MPEG-2 and MPEG-4. Other standards include the International Telecommunication Union (ITU) H.263 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Furthermore, new standards continue to emerge and evolve, including the emerging ITU H.264 standard and a number of proprietary standards. The ITU H.264 standard is also set forth in MPEG-4 Part 10, entitled "Advanced Audio Coding."

Many multimedia coding standards support data compression, which reduces the overall amount of data that needs to be transmitted for effective transmission of multimedia frames. The MPEG standards and the ITU H.263 and ITU H.264 standards, for example, support coding techniques that utilize similarities between successive video frames, referred to as temporal or inter-frame correlation, to provide inter-frame compression. Such inter-frame compression is typically achieved via motion estimation and motion compensation coding techniques. In addition, some multimedia coding techniques may utilize similarities within frames, referred to as spatial or intra-frame correlation, to compress the video frames.

Most inter-frame compression techniques utilize block-based coding, which divides multimedia frames into blocks of data and correlates the blocks with those of other frames in the multimedia sequence. By encoding the differences between a current block and a predictive block of another frame, data compression can be achieved. The encoder typically divides a multimedia frame to be transmitted into blocks of data, referred to as "macroblocks." The macroblocks may also be further sub-divided into partitions or sub-partitions. The ITU H.264 standard supports 16 by 16 macroblocks, 16 by 8 partitions, 8 by 16 partitions, 8 by 8 partitions, 8 by 4 sub-partitions, 4 by 8 sub-partitions and 4 by 4 sub-partitions. Other standards may support differently sized blocks, macroblocks, partitions and/or sub-partitions.

For each block (macroblock, partition or sub-partition) in a multimedia frame, the encoder searches similarly sized blocks of one or more immediately preceding video frames (or subsequent frames) to identify a similar block, referred to as the "prediction block." The process of comparing a current video block to video blocks of other frames is generally referred to as motion estimation. Once a "prediction block" is identified for a given block to be coded, the encoder can encode the differences between the current block and the prediction block. This process of encoding the differences between the current block and the prediction block includes a process referred to as motion compensation. Motion compensation comprises creating a difference block indicative of the differences between the current block to be encoded and the prediction block. In particular, motion compensation usually refers to the act of fetching the prediction block using a motion vector, and then subtracting the prediction block from an input block to generate a difference block.

After motion compensation has created the difference block, a series of additional encoding steps are typically performed to further encode the difference block. These additional steps may include discrete cosine transform, scalar quantization, raster-to-zigzag reordering, run-length encoding, Huffman encoding, or the like. An encoded difference block can be transmitted along with a motion vector that indicates which block from the previous frame (or subsequent frame) was used for the encoding. A decoder receives the motion vector and the encoded difference block, and decodes the received information to reconstruct the multimedia sequences.

In order to improve the coding process, mode decisions are often made during the motion estimation process. These mode decisions may be part of a rate control algorithm, and may be used to determine how the macroblocks should be divided or sub-divided to ensure that a desirable rate-distortion balance is achieved. In this disclosure, the phrase "mode selection" refers to the selection of one or more possible coding modes for a macroblock or the like, e.g., whether the macroblock should be coded as one 16 by 16 block or whether two or more partitions or sub-partitions should be defined for the macroblock. Unfortunately, a full search of every possible coding mode for every macroblock of a video sequence can be computationally prohibitive for many devices or multimedia encoding situations.

SUMMARY

This disclosure describes techniques for improving mode selection decisions during the encoding of macroblocks (or other sized blocks of multimedia data) of multimedia frames of a multimedia sequence. During motion estimation, the encoding modes for macroblocks can be determined so that a desirable encoding rate and acceptable levels of distortion (i.e., acceptable rate-distortion) can be achieved. This disclosure describes a pre-processing procedure that can be performed on a multimedia sequence in order to possibly eliminate mode searches associated with highly improbable modes for a macroblock that would otherwise be performed.

The techniques may utilize a detail metric for every macroblock, and this detail metric may be related to the number of bits that a given macroblock needs to be encoded at constant visual quality. The techniques may define two or more sets of modes, and one of these sets can be selected. Accordingly, the modes of the non-selected set may be eliminated from consideration when the modes in that set are highly improbable for a given macroblock. In some cases, the techniques make use of probability equations that include the detail metric. In this disclosure, an example of two sets of modes (inter-planar and inter-detail) is defined, although the techniques of this disclosure are not necessarily limited in this respect.

The described techniques may also determine mode information associated with neighboring blocks, and use this mode information to improve the mode selection for a current macroblock. Furthermore, statistics in the probability equations can be updated following each mode selection, and the updates to the probability equations can be used for mode selection decisions of subsequent macroblocks. By updating the statistics of the probability equations over the course of mode selection of macroblocks in the frames of a multimedia sequence, the technique may adapt to the content of the multimedia sequence in order to improve the mode selection over the multimedia sequence.

In some embodiments, this disclosure provides a method for processing multimedia data comprising selecting a set of multimedia coding modes from at least two sets of possible multimedia coding modes for a block of a multimedia frame based on a detail metric associated with the block and mode information associated with neighboring blocks to the block.

In some embodiments, this disclosure provides an apparatus for processing multimedia data comprising an encoder that selects a set of multimedia coding modes from at least two sets of possible multimedia coding modes for a block of a multimedia frame based on a detail metric associated with the block and mode information associated with neighboring blocks to the block.

In some embodiments, this disclosure provides a processor for processing multimedia data, the processor being configured to select a set of multimedia coding modes from at least two sets of possible multimedia coding modes for a block of a multimedia frame based on a detail metric associated with the block and mode information associated with neighboring blocks to the block.

In some embodiments, this disclosure provides an apparatus for processing multimedia data comprising means for selecting a set of multimedia coding modes from at least two sets of possible multimedia coding modes for a block of a multimedia frame based on a detail metric associated with the block and mode information associated with neighboring blocks to the block.

The techniques described herein may be implemented in hardware, software, firmware, or any combination thereof. If implemented in software, the software may be executed in a digital signal processor (DSP) or other type of processor. The software that executes the techniques may be initially stored in a machine-readable medium, such as a computer-readable medium, and loaded and executed in the processor, apparatus, or other machine to allow for mode selection as described herein.

Accordingly, this disclosure also contemplates a machine-readable medium comprising instructions for processing multimedia data that upon execution cause a machine to select a set of multimedia coding modes from at least two sets of possible multimedia coding modes for a block of a multimedia frame based on a detail metric associated with the block and mode information associated with neighboring blocks to the block.

Additional details of various embodiments are set forth in the accompanying drawings and the description below. Other features, objects and advantages will become apparent from the description and drawings, and from the claims.

BRIEF DESCRIPTION OF DRAWINGS

FIG. 5 is a conceptual diagram illustrating possible spatial and/or temporal neighbors to a current macroblock being coded according to some embodiments of this disclosure.

DETAILED DESCRIPTION

This disclosure describes techniques for improving mode selection decisions during the encoding of macroblocks, or the like, of multimedia frames of a multimedia sequence. In this disclosure, the phrase "mode selection" refers to the selection of one or more possible coding modes for a macroblock or other sized block of multimedia data, e.g., whether the macroblock should be coded as one 16 by 16 block or whether two or more partitions or sub-partitions should be defined for the macroblock. Such mode decisions are often are made during the motion estimation process, and may be part of a rate control algorithm to determine how the macroblocks should be divided or sub-divided to ensure that a desirable rate-distortion balance is achieved over a frame of a full multimedia sequence of frames. The modes selected for the macroblocks generally define the granularity of the macroblock in terms of partitions and/or sub-partitions, i.e., partitions, sub-partitions, or partitions and sub-partitions. The mode selection techniques of this disclosure, however, are not necessarily limited to any specific size of macroblock, block, partitions or sub-partitions.

According to this disclosure, during motion estimation, a pre-processing procedure can be performed on a multimedia sequence in order to possibly eliminate mode searches associated with highly improbable modes for a macroblock. The described techniques may utilize a detail metric for every macroblock, and this detail metric may be related to the number of bits that a given macroblock needs to be encoded at constant visual quality. The techniques may also mode information associated with neighboring blocks, and use this mode information to improve the mode selection for a current macroblock.

The techniques may define at least two sets of modes, and one of these sets can be selected. In this disclosure, an example of two sets of modes (inter-planar and inter-detail) are defined, although the techniques of this disclose are not necessarily limited in this respect. In any case, the modes of the non-selected set may be eliminated from consideration when the modes in that set are highly improbable for a given macroblock. The techniques may use probability equations that include the detail metric and the mode selection information associated with the neighboring blocks.

Furthermore, statistics in the probability equations can be updated following each mode selection, and the updates to the probability equations can be used for mode selection decisions of subsequent macroblocks. In this manner, the technique may adapt to the content of a given multimedia sequence in order to improve the mode selection over the multimedia sequence.

Figure 1:
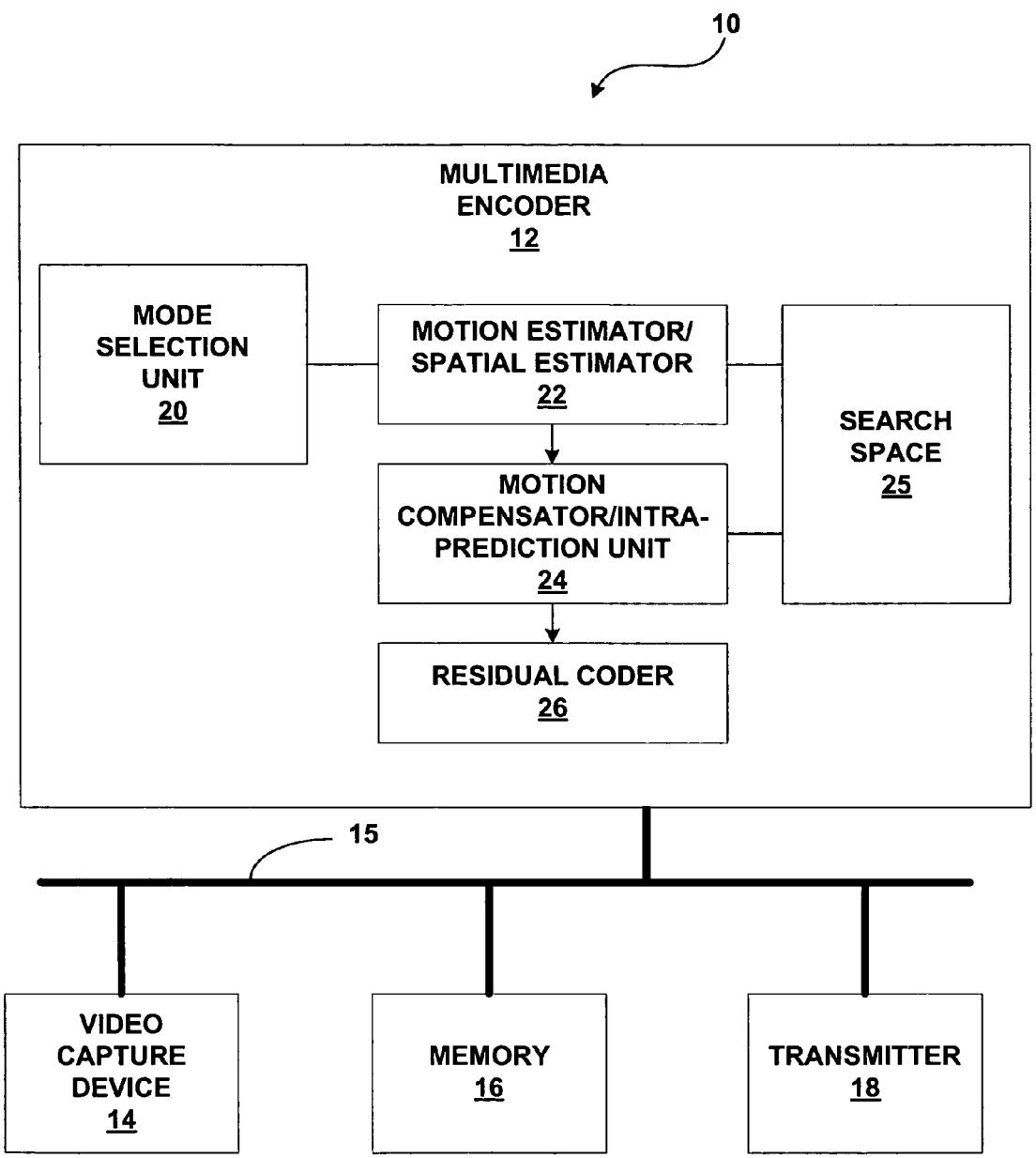
FIG. 1 is a block diagram illustrating an exemplary multimedia coding device according to some embodiments of this disclosure.

FIG. 1 is a block diagram illustrating an exemplary multimedia coding device 10. Multimedia coding device 10 may form part of a digital video device capable of encoding and transmitting video data. As an example, multimedia coding device 10 may comprise a broadcast device that broadcasts one or more channels of multimedia sequences to wireless subscriber devices. In another example, multimedia coding device 10 may comprise a wireless handheld unit capable of communicating multimedia sequences to other devices, e.g., to facilitate video telephony (VT) or other multimedia applications.

As shown in FIG. 1, multimedia coding device 10 includes a multimedia encoder 12 that encodes multimedia sequences using one or more of the techniques described herein. In addition, multimedia coding device 10 may include many other components, such as a video capture device 14 to capture multimedia sequences, a memory 16 to store or possibly archive multimedia sequences, and a transmitter 18 to transmit encoded multimedia sequences to other devices. Some or all of these additional components, however, are optional in device 10. Multimedia encoder 12, video capture device 14, memory 16 and transmitter 18 may be communicatively coupled via a communication bus 15 or the like.

Multimedia sequences may be captured by video capture device 14, retrieved from memory 16, or obtained in another manner. In any case, multimedia encoder 12 of multimedia coding device 10 can be used to encode the multimedia sequence, and can implement one or more of the techniques of this disclosure to improve this encoding process. Multimedia coding device 10 may be implemented in devices such as digital broadcast systems, digital televisions, wireless communication devices, personal digital assistants (PDAs), laptop computers, desktop computers, digital cameras, digital recording devices, cellular or satellite radio telephones, or any device that includes multimedia encoding capabilities. Multimedia encoding device 10 may comply with a multimedia coding standard such as MPEG-4, ITU-T H.263, ITU-T H.264, or another coding standard that provides for several possible coding modes for macroblocks of data in the frames of a multimedia sequence.

Multimedia encoder 12 may comprise a so called "chip set," and may be implemented via any combination of hardware, software, firmware, and/or one or more microprocessors, digital signal processors (DSPs), application specific integrated circuits (ASICs), field programmable gate arrays (FPGAs), or various combinations thereof. Multimedia encoder 12 may comprise an encoder/decoder (CODEC) for encoding and decoding digital multimedia sequences. Furthermore, in some cases, the functionality of multimedia encoder 12 may be software-implemented, in whole or in part. Accordingly, this disclosure also contemplates a machine-readable medium comprising instructions that upon execution cause a machine (an apparatus such as a processor or DSP) to execute the techniques described herein.

Multimedia encoder 12 includes a mode selection unit 20, which performs mode selection techniques as part of a motion estimation process during inter-coding. Multimedia encoder 12 includes a motion estimator/spatial estimator 22 which may be integrated or separate units. Multimedia encoder 12 also includes a motion compensator/intra-prediction unit 24, which may be integrated or separate units. Search space 25 represents a memory unit that stores data used for predictive-based coding, e.g., typically a previous frame or portion of a previous frame of a multimedia sequence. Finally, multimedia encoder 12 includes a residual coder 26 that performs one or more residual coding processes on a residual block generated during the motion estimation and motion compensation processes.

During the encoding process, motion estimator/spatial estimator 22 compares a current multimedia block of data to various blocks in search space 25 in order to identify a prediction block. Motion estimator/spatial estimator 22 generally represents a motion estimator that performs motion estimation for inter-frame coding, a spatial estimator that performs spatial estimation for intra-frame coding, or a combined unit that can perform motion estimation and spatial estimation. In general, the prediction block is a candidate block found to provide an adequate match with the current multimedia block of data for purposes of inter-frame correlation (or intra-frame correlation), which may be the most closely matching candidate block in the search space. The prediction block is one of many candidate blocks in search space 25 that is evaluated during the motion estimation. For inter coding, the motion estimation process is typically performed with respect to every partition and sub-partition of a macroblock. The techniques of this disclosure can help to identify the mode (which defines the number and shapes of partitions and sub-partitions) for coding a given macroblock.

In order to perform the comparisons between the current multimedia block of data to be coded and the candidate blocks in a search space, motion estimator/spatial estimator 22 may perform sum of absolute difference (SAD) techniques, sum of squared difference (SSD) techniques, or other comparison techniques on pixel intensity values associated with the block. In this manner, motion estimator/spatial estimator 22 can determine the difference values for the different candidate blocks. A lower difference value generally indicates that a candidate block is a better match to a block being coded, and thus a better candidate for use in motion estimation coding than other candidate blocks yielding higher difference values. A prediction block of data may be identified once a suitable match is found.

Once a block is identified by motion estimator/spatial estimator 22 for a multimedia block to be coded, motion compensator/intra-prediction unit 24 creates a residual. The residual is a block of data indicative of differences between the current multimedia block to be coded and the prediction block identified by motion estimation or spatial estimation. Motion compensator/intra-prediction unit 24 generally represents a motion compensator that performs motion compensation for inter-frame coding, an intra-prediction unit that performs spatial compensation for intra-frame coding, or a combined unit that can perform either motion compensation or intra-prediction depending upon whether inter-frame or intra-frame coding is being used. Motion compensator/intra-prediction unit 24 may fetch the prediction block from search space 25 using a motion vector, and then subtract the prediction block from an input block to generate the residual. The residual typically includes substantially less data than the original video block that is represented by the difference block, resulting in data compression.

After motion compensator/intra-prediction unit 24 has created the residual, residual coder 26 may perform one or more residual coding steps, such as discrete cosine transformation (DCT), zig-zag scanning, run length coding, variable length ("Huffman") coding, or any other process used in a given coding standard. Numerous other residual coding steps may also be performed. The motion estimation, motion compensation and residual coding processes may be performed with respect to every block (i.e., every macroblock, partition and/or sub-partition) defined by a selected mode of a given macroblock.

According to this disclosure, during motion estimation, mode selection unit 20 performs a pre-processing procedure on macroblocks of the frames of a multimedia sequence in order to possibly eliminate mode searches associated with highly improbable modes for a respective macroblock. In particular, mode selection unit 20 defines a detail metric for every macroblock, and this detail metric may be related to the number of bits that a given macroblock needs to be encoded at constant visual quality. Mode selection unit 20 also considers the modes of neighboring blocks in performing such mode selections. Mode selection unit 20 may define two or more sets of modes, and one of these sets can be selected. As an example, mode selection unit 20 can define an inter-planar set of modes and an inter-detail set of modes. The inter-planar modes include macroblock modes in which the macroblock includes one 16 by 16 partition (inter 16 by 16 mode), two 16 by 8 partitions (inter 16 by 8 mode), or two 8 by 16 partitions (inter 8 by 16 mode). The inter-planar modes may also include a "SKIP" mode in which coding is skipped for that macroblock. On the other hand, the inter-detail modes include macroblock modes in which the macroblock includes four 8 by 8 partitions (inter 8 by 8 mode), one or more 8 by 4 sub-partitions (inter 8 by 4 mode), one or more 4 by 8 sub-partitions (inter 4 by 8 mode) or one or more 4 by 4 sub-partitions (inter 4 by 4 mode).

The actual number of possible modes in the inter-detail is relatively large due to the many combinations and sub-combinations of partitions and sub-partitions. However, experimental research has shown that over 95 percent of the macroblocks in most multimedia sequences are encoded with 16 by 16, 16 by 8, 8 by 16 or 8 by 8 partitions. Thus, fewer than 5 percent of macroblocks are typically coded at the sub-partition level. In order to search every possible mode (every possible combination of partitions and sub-partitions), over 90 percent of the time may be spent searching modes that include small sub-partitions, even though fewer than 5 percent of the macroblocks may actually use these modes. This disclosure employs statistical probability techniques to determine when sub-partitions will very likely not be used. In such cases, the searching of such modes that include sub-partitions can be avoided.

Accordingly, mode selection unit 20 may use probability equations. The probability equations may include as variables, the detail metric in the form of a temporal bandwidth ratio metric, and mode information associated with neighboring blocks. The detail metric may be indicative of temporal and spatial detail in the macroblock. The mode information associated with neighboring blocks may be weighted based on temporal and/or spatial proximity to the current block. For example, for the mode information of neighboring blocks, mode selection unit 20 may weigh mode information of a first sub-set of blocks within a frame differently than mode information of a second sub-set of blocks within a different frame due to temporal differences between the different sub-sets of blocks. In any case, the detail metric and the mode information associated with neighboring blocks can be analyzed to improve the mode selection for a current macroblock.

The statistics in the probability equations can be updated following each mode selection for each macroblock, and the updates to the probability equations can be used for mode selection decisions of subsequent macroblocks. In this manner, mode selection unit 20 can adapt to the content of a given sequence in order to improve the mode selection over a full motion multimedia sequence. Ultimately, mode selection unit 20 selects a mode for coding a respective macroblock from the selected set of possible multimedia coding modes. In many cases, the techniques described herein can help to avoid motion searches associated with modes for the macroblock in a non-selected set of multimedia coding modes.

Figure 2:
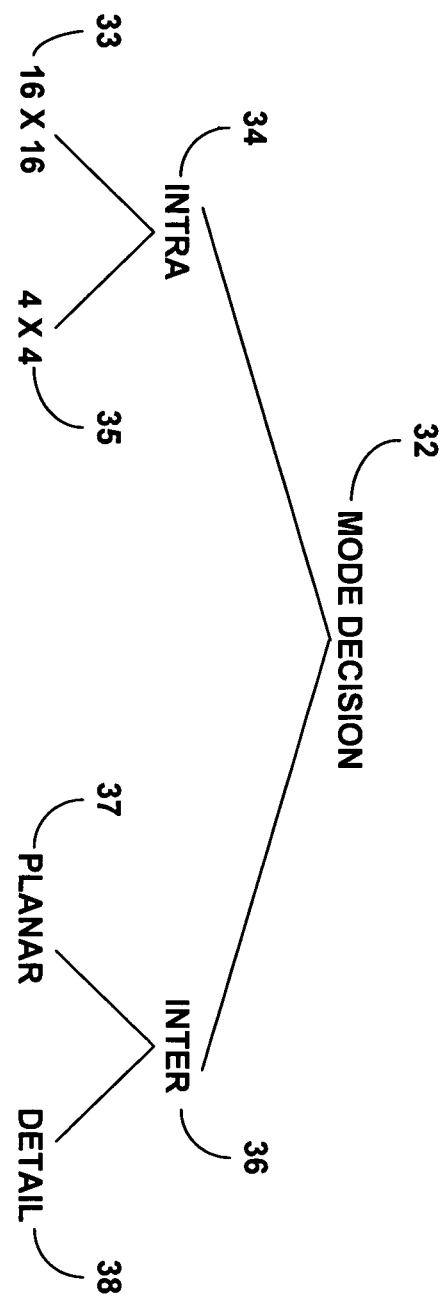
FIG. 2 is a tree diagram illustrating a mode selection process consistent with some embodiments of this disclosure.

FIG. 2 is a tree diagram a mode selection process that may be implemented by mode selection unit 20. In particular, mode decision 32 may involve a decision whether to use intra-coding 34 or inter-coding 36. If intra-coding 34 is used, mode selection unit 20 determines whether to code macroblocks as 16 by 16 blocks (33) or sets of 4 by 4 blocks (35), and this decision may be affected by the level of content in the macroblock and the level of rate-distortion desired.

If inter-coding 36 is used, mode selection unit 20 determines whether to use intra-planar modes 37 or intra-detail modes 38. Again, this can significantly simply mode searches, e.g., by avoiding detailed sub-partition searches when intra-planar modes 37 are selected. This mode selection process may form part of a rate control algorithm used to achieve relatively constant multimedia quality of an encoded sequence by balancing the encoding rate and the level of distortion in the encoding process.

Figure 3:
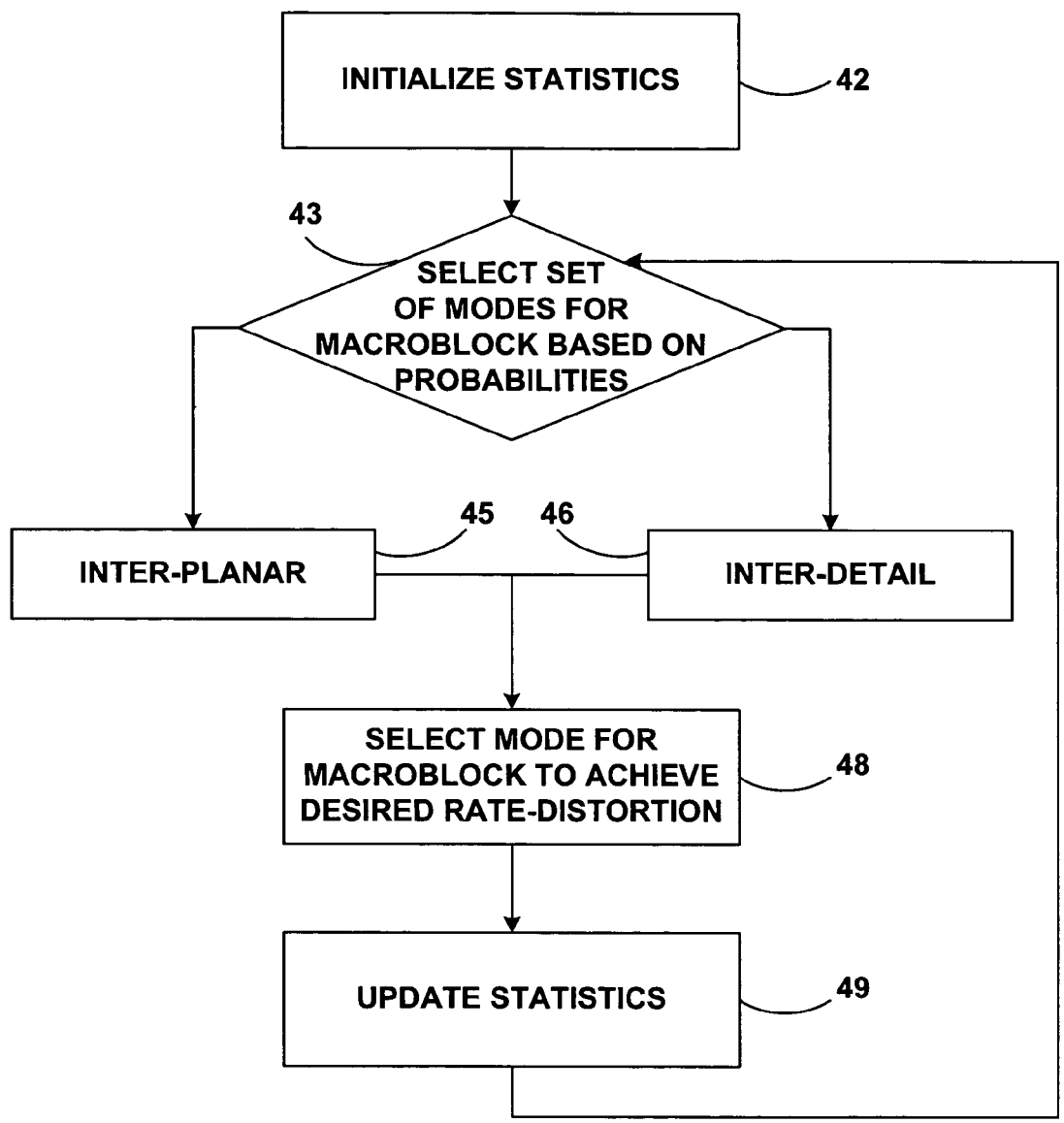
FIG. 3 is a flow diagram illustrating a technique according to some embodiments of this disclosure.

The mode selection techniques of this disclosure specifically apply during a pre-processing procedure associated with a motion estimation process during inter-coding. FIG. 3 is a flow diagram illustrating a technique that can be performed in this context. As shown, mode selection unit 20 initializes statistics associated with the mode selection process (42). For example, the statistics may comprise probability equations that are initialized by accessing average mode-related statistics for a very large sample of multimedia frames processed during device manufacture. The initialized equations, for example, may be pre-programmed based on simulations of test sequences, but may have also been updated to reflect coding processes previously performed by multimedia encoding device 10.

Next, mode selection unit 20 selects a set of modes for a macroblock of a frame of a multimedia sequence based on probabilities (43). The probabilities may be expressed as probability equations, and the equations may include a detail metric indicative of temporal and spatial detail in the macroblock and mode information associated with neighboring blocks to the macroblock. In one specific illustrative example, the modes are divided into two possible sets of modes for inter-coding, a set of inter-planar modes and a set of inter-detail modes. In some cases, when the set of inter-planar modes is selected (45), the other modes associated with the inter-detail modes can be ignored. In some cases, when the set of inter-detail modes is selected (46) the other modes associated with the inter-planar modes can be ignored. In some cases discussed below (not shown in FIG. 3), an exhaustive search may be desirable to search every possible mode of both the inter-detail set and the inter-planar set. In other words, although FIG. 3 shows inter-planar modes and inter-detail modes, a full search of all modes is performed in some cases, e.g., in cases where it is difficult to statistically eliminate the inter-planar modes or the inter-detail modes. In this sense, FIG. 3 simply illustrates the scenarios where either the inter-detail or inter planar modes are selected, even though all of the modes could be selected and searched in other scenarios.

In any case, mode selection unit 20 then selects the desired mode for a given macroblock in order to achieve a desired level of rate-distortion (48). In this case, if an exhaustive search of every possible mode was avoided in favor of searching on those modes in either the inter-planar set or the inter-detail set, significant computational savings can be achieved. Once the mode is selected for that given macroblock (48), mode selection unit 20 updates the probability statistics (49), which allows the algorithm to adapt to different content. The mode selection process may be repeated for the next macroblock, and may continue for every macroblock of every frame of a multimedia sequence.

The techniques of this disclosure may be particularly useful for mode decisions according to ITU H.264 (also described in MPEG-4, part 10 entitled "advanced audio coding"). In advanced audio coding, the inter mode decision is typically performed after evaluating the efficiency of motion estimation. However, because advanced audio coding allows many different block sizes within a macroblock, and every block partition corresponds to an individual motion estimation, the total computation complexity can become extensive. In this case, the techniques of this disclosure may ignore some block sizes that are unlikely to be the desirable choice for a given macroblock.

Again, mode selection unit 20 preprocesses a multimedia sequence to obtain a temporal bandwidth ratio metric for every macroblock. As mentioned, this metric is highly related to the number of bits used to encode a respective macroblock at constant visual quality. One example calculation of a temporal bandwidth ratio map is as follows:

$$\beta_{INTER} = \beta_{0INTER}\log_{10}\left(1 + \alpha_{INTER} \cdot \left(\frac{256}{1+Y}\right)^2 \cdot SSD \cdot \right.$$
$$\left. D_{csat}\exp(-\min(1, \gamma\|MV_P + MV_N\|^2))\right)$$

where $D_{csat}$ is a sensitivity metric from, Y is the average luminance component of a macroblock, $\alpha_{INTER}=1$ is a weighing factor for the luminance square and the $D_{csat}$ value, $\beta_{0INTER}$ is a normalization factor, $MV_P$ and $MV_N$ are the forward and the backward motion vectors for the current macroblock, and SSD stands for sum of squared difference. If SSD is not available, $SAD^2$ (sum of absolute difference) can be used instead.

In one example, a "hypothesis" test can be defined for two cases (H0 and H1): H0: INTER-planar (including INTER16×16, INTER16×8, INTER8×16, and SKIP); and H1: INTER-detail (including INTER8×8, INTER8×4, INTER4×8, and INTER4×4). The test is referred to as a "hypothesis" test because the test hypothesizes the most likely set of modes (inter-planar or inter-detail) based on probabilities. Of course, the techniques of this disclosure could also be extended to more cases, i.e., more sets of modes or different sets of modes.

Figure 4:
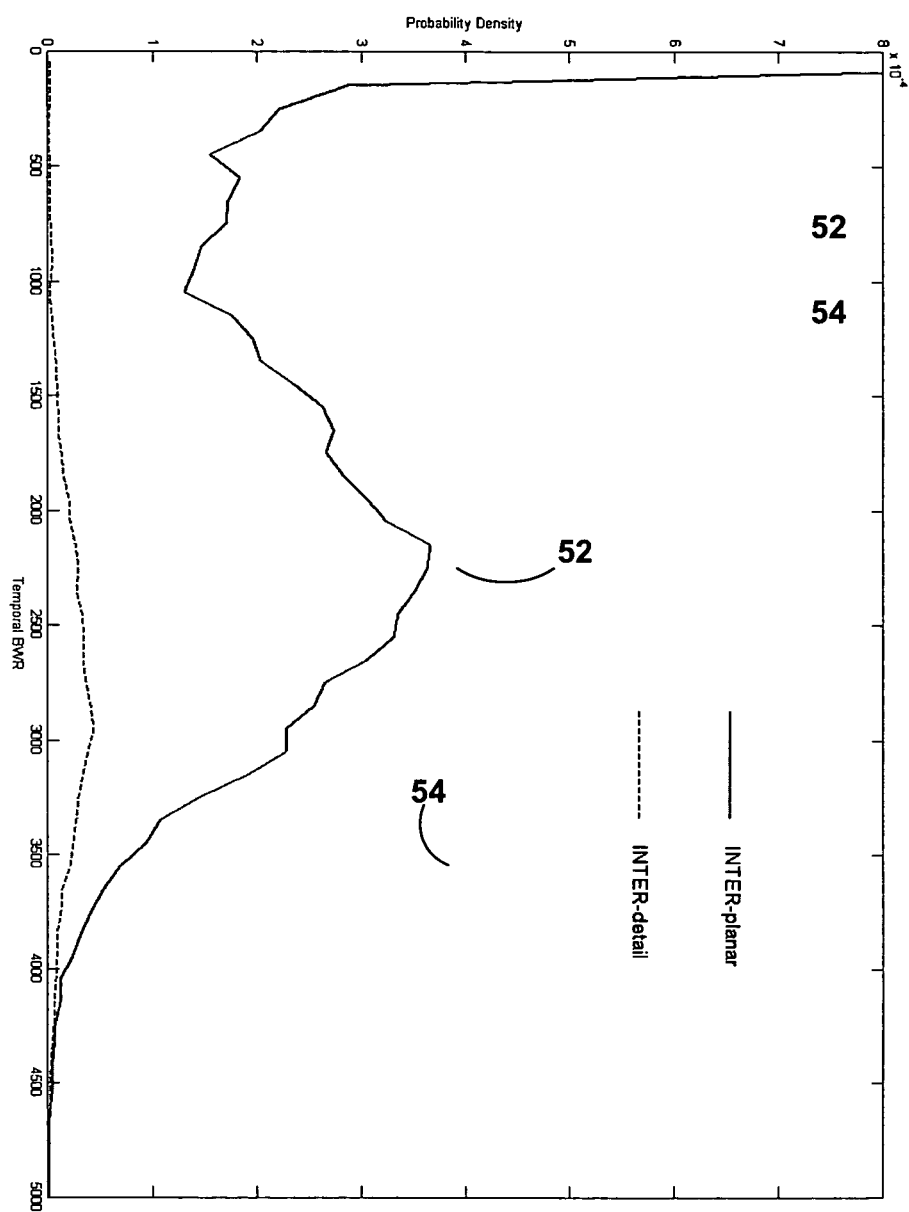
FIG. 4 is a graph including histograms of probabilities associated with two different sets of modes according to some embodiments of this disclosure.

At the beginning of a multimedia coded bitstream, mode selection unit 20 initializes a histogram of INTER-planar 52 and INTER-detail 54, as shown in FIG. 4. The initialized histograms may have been obtained from simulation of several long testing simulation sequences of different content categories. Testing sequences processed in the factory and pre-stored on a given device 10, for example, may be used to define the initialized histograms. However, once device 10 has processed one or more multimedia sequences, the processing of these additional sequences may also be reflected in the initialized histograms during the processing of subsequent sequences. In this manner, even the initialization of the mode selection techniques described herein may evolve and improve over time.

For a new macroblock with a temporal bandwidth ratio metric "b," mode selection unit 20 calculates a probability based solely on the histograms of FIG. 4 as:

$$p_0 = \begin{cases} \frac{H_0(b)}{H_0(b) + H_1(b)}, & \text{if } H_0(b) + H_1(b) \geq \varepsilon, \\ 0.5, & \text{otherwise,} \end{cases}$$

$$p_1 \begin{cases} \frac{H_1(b)}{H_0(b) + H_1(b)}, & \text{if } H_0(b) + H_1(b) \geq \varepsilon, \\ 0.5, & \text{otherwise,} \end{cases}$$

where $\varepsilon$ is a small positive number to prevent lack of data.

The mode of a macroblock is correlated to its spatial and temporal neighbors. That is to say, it is generally desirable to maintain similar modes for spatial and temporal neighboring macroblocks. The modes of such spatial and temporal neighbors may define a macroblock mode map. Maintaining a smooth macroblock mode map can reduce the bits used to signify macroblock-coded modes.

Figure 5:
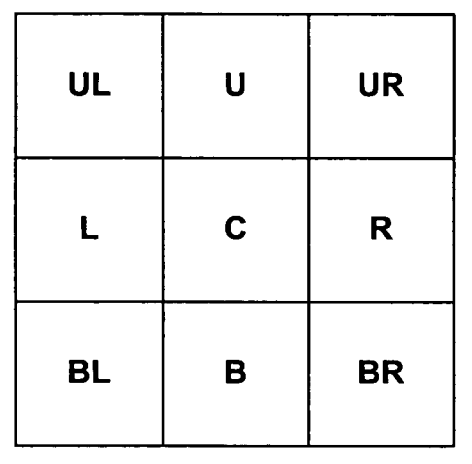

From FIG. 5 it can be seen that a current macroblock can have four to nine neighbors, depending on if the macroblock is on a corner of a frame, on a border of the frame, or inside the frame. Among the neighbors shown in FIG. 5, upper left (UL), upper (U), upper right (UR), and left (L) have their modes determined in the current frame, i.e., from spatial neighbors within the frame. The mode of center (C), right (R), below left (BL), below (B), and below right (BR) can be obtained from the previous frame, i.e. from temporal neighbors within a neighboring frame.

Mode selection unit 20 may calculate:

$$q_0 = 2 \times (I(M_{UL} == \text{INTERplanar}) + I(M_U == \text{INTERplanar}) + $$
$$I(M_{UR} == \text{INTERplanar}) + I(M_L == \text{INTERplanar}) + $$
$$I(M_C == \text{INTERplanar})) + I(M_R == \text{INTERplanar}) + $$
$$I(M_{BL} == \text{INTERplanar}) + I(M_B == \text{INTERplanar}) + $$
$$I(M_{BR} == \text{INTERplanar}),$$

and $$q_1 = 2 \times (I(M_{UL} == \text{INTERdetail}) + I(M_U == \text{INTERdetail}) + $$
$$I(M_{UR} == \text{INTERdetail}) + I(M_L == \text{INTERdetail}) + $$
$$I(M_C == \text{INTERdetail})) + I(M_R == \text{INTERdetail}) + $$
$$I(M_{BL} == \text{INTERdetail}) + I(M_B == \text{INTERdetail}) + $$
$$I(M_{BR} == \text{INTERdetail})$$

where I(•) is the indicator function. The indicator function refers to a function defined on a set that indicates membership of an element in a subset of the set. In the example above, a double weight is applied to the four spatially causal neighbors (UL, U, UR, L) and the temporal central neighbor (C) relative to the other temporal neighbors, due to their closer spatial and temporal distances relative to the current macroblock.

Mode selection unit 20 may also determine hypothetical probabilities of modes in the inter-planar set and the inter-detail set as:

$$h_0 = \frac{H_0(b) + \alpha q_0}{(H_0(b) + \alpha q_0) + (H_1(b) + \alpha q_1)},$$

$$h_1 = \frac{H_1(b) + \alpha q_1}{(H_0(b) + \alpha q_0) + (H_1(b) + \alpha q_1)},$$

where $\alpha$ is a weighting factor to adjust the significance of neighboring macroblock modes in mode decision.

Mode selection unit 20 can define a confidence level to be "t." Mode selection unit 20 can then calculate the updated hypothetical probabilities as:

$$h'_0 = \begin{cases} h_0, & \text{if } h_0 \geq t \text{ [select INTER-planar w/o full } R-D\text{]}, \\ h_0, & \text{if } h_0 \leq 1-t \text{ [select INTER-detail w/o full } R-D\text{]}, \\ 1, & \text{if } t < h_0 < 1-t \text{ [full } R-D \text{ selects INTER-planar]}, \\ 0, & \text{if } t < h_0 < 1-t \text{ [full } R-D \text{ selects INTER-detail]}, \end{cases}$$

$$h'_1 = \begin{cases} h_1, & \text{if } h_1 \geq t \text{ [select INTER-detail w/o full } R-D\text{]}, \\ h_1, & \text{if } h_1 \leq 1-t \text{ [select INTER-planar w/o full } R-D\text{]}, \\ 1, & \text{if } t < h_1 < 1-t \text{ [full } R-D \text{ selects INTER-detail]}, \\ 0, & \text{if } t < h_1 < 1-t \text{ [full } R-D \text{ selects INTER-planar]}, \end{cases}$$

Computational savings are achieved in those cases above, when a set of modes are selected without (w/o) a full rate-distortion (R-D) search. At the end of every frame, mode selection unit 20 can find the histogram of the current frame hypothetical probabilities. The current frame hypothetical probabilities can be denoted $H'_0$ and $H'_1$. Accordingly, the long-term hypothetical probabilities can be updated in the following manner:

$$H_0(b) \leftarrow \frac{H_0(b) + \beta H'_0(b)}{H_0(b) + \beta H'_0(b) + H_1(b) + \beta H'_1(b)},$$

$$H_1(b) \leftarrow \frac{H_1(b) + \beta H'_1(b)}{H_0(b) + \beta H'_0(b) + H_1(b) + \beta H'_1(b)},$$

where $\beta$ is a weighting factor for adjusting the updating speed.

By considering a tradeoff between computation load and PSNR performance, the parameter set $\alpha=\mathbf{0.10}$, $\beta=\mathbf{0.2}$, t=0.90 can be selected in mode selection unit 20. The confidence level can also be adjusted to achieve different levels of quality and complexity in the encoded multimedia sequences. Simulation results have shown that implementation of these techniques can reduce the number of fully searched macroblocks bay about one-sixth relative to full searches with a negligible PSNR loss of approximately 0.1~0.14 dB.

Figure 6:
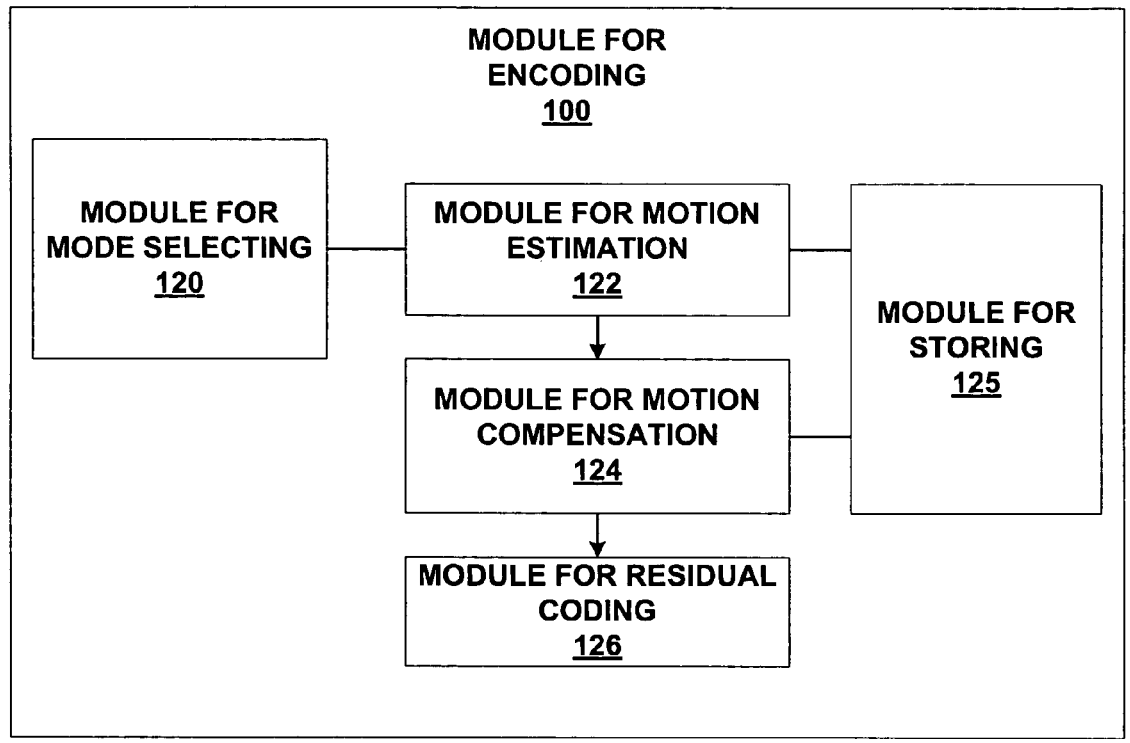
FIG. 6 is a block diagram illustrating an exemplary module for encoding according to some embodiments of this disclosure.

FIG. 6 is a block diagram illustrating a module for encoding 100, which may comprise an encoder and may form part of a digital video device capable of encoding and transmitting multimedia data. Module for encoding 100 includes a module for mode selection 120, which performs mode selection techniques as part of a motion estimation process during inter-coding. Module for encoding 120 also includes a module for motion estimation 122 and a module for motion compensation 124, which may comprise a motion estimator and a motion compensator respectively. Module for encoding 100 may comprise a module for storing 125, which may be a memory unit or the like. Module for encoding 100 may also include a module for residual coding 126, which may comprise a residual coder.

During the encoding process, module for motion estimation 122 perform a motion estimation process and module for motion compensation 124 performs a motion compensation process. The data used in this encoding process may be accessed from module for storing 125. After the motion estimation and motion compensation processes have been performed, module for residual coding 126 may perform one or more residual coding steps on residual blocks.

According to this disclosure, during motion estimation, module for mode selection 120 performs a pre-processing procedure on macroblocks of the frames of a multimedia sequence in order to possibly eliminate mode searches associated with highly improbable modes for a respective macroblock. In particular, module for mode selection 120 defines a detail metric for every inter-coded macroblock and uses mode information associated with neighboring blocks. Module for mode selection 120 may use probability equations, and the probability equations may include the detail metric and the mode information associated with neighboring blocks.

The statistics in the probability equations can be updated following each mode selection for each macroblock, and the updates to the probability equations can be used for mode selection decisions of subsequent macroblocks. In this manner, module for mode selection 120 can adapt to the content of a given sequence in order to improve the mode selection over a full motion multimedia sequence. Ultimately, module for mode selection 120 selects a mode for coding a respective macroblock from the selected set of possible multimedia coding modes. In many cases, the techniques executed by module for mode selection 120 can help to avoid motion searches associated with modes for the macroblock in a non-selected set of multimedia coding modes.

In accordance with this disclosure, means for selecting a set of multimedia coding modes may comprise a mode selection unit 20 (FIG. 1) or a module for selecting 120 (FIG. 6). Similarly, means for motion estimation may comprise a motion estimator/spatial estimator 22 (FIG. 1) or a module for motion estimation 122 (FIG. 6). Means for motion compensation may comprise a motion compensator/intra-prediction unit 24 (FIG. 1) or a module for motion compensation 124 (FIG. 6), and means for residual coding may comprise a residual coder 26 (FIG. 1) or a module for residual coding 126 (FIG. 6). Means for storing may comprise a search space 25 (FIG. 1) or a module for storing 125 (FIG. 6). A means for updating statistics may also be used to update probability equations for mode selection decisions, and this means for updating may comprise any hardware software, firmware or the like, which is designed or programmed to perform statistical updates to histograms or the like, such as histograms similar to those shown in FIG. 4.

A number of embodiments have been described. In particular, mode selection techniques have been described for a motion estimation process so that encoding modes for macroblocks can be determined to achieve a desirable encoding rate and acceptable levels of distortion (i.e., acceptable rate-distortion). As described, the techniques may utilize a detail metric for every macroblock and mode information associated with neighboring blocks to the respective macroblocks. Probability equations may be implemented to use the detail metric and the mode information associated with neighboring blocks, and statistics in the probability equations can be updated following each mode selection in order to adapt to the content of a given sequence. The techniques may define at least two sets of modes, and one of these sets can be selected, possibly eliminating unnecessary searches associated with the other set of modes. The techniques may also be applicable to other block sizes, i.e., block sizes different than 16 by 16 macroblocks. The size of the block and modes supported may be defined by a respective coding standard. In any case, the block may have several possible modes defined by partitions and/or sub-partitions of the block, and the techniques described herein may be used to improve mode selection.

The techniques described herein may be implemented in hardware, software, firmware, or any combination thereof. If implemented in software, the techniques may be realized in part by a computer readable medium (or other machine-readable medium) comprising program code containing instructions that, when executed, performs one or more of the techniques described herein. In this case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The instructions may be executed by one or more processors or other machines, such as one or more digital signal processors (DSPs), general purpose microprocessors, an application specific integrated circuits (ASICs), field programmable logic arrays (FPGAs), or other equivalent integrated or discrete logic circuitry. Generally, the machine that executes the instructions may comprise an apparatus. In some embodiments, the functionality described herein may be provided within dedicated software modules or hardware modules or units configured for encoding and decoding, or incorporated in a combined video encoder-decoder (CODEC).

Nevertheless, various modifications may be made to the techniques described without departing from the scope of the following claims. Accordingly, the specific embodiments described above, and other embodiments are within the scope of the following claims.

The invention claimed is:

1. A method for processing multimedia data comprising:
selecting, by an implementation consisting of a technique in conjunction with hardware, a non-transitory machine readable medium using a processor, or a combination thereof, a set of multimedia coding modes from at least two sets of possible multimedia coding modes for a block of a multimedia frame based on one or more probability equations that include variables corresponding to mode information associated with neighboring blocks to the block, the probability equations including at least one of;

$$h_0 = \frac{H_0(b) + \alpha q_0}{(H_0(b) + \alpha q_0) + (H_1(b) + \alpha q_1)},$$

OR $$h_1 = \frac{H_1(b) + \alpha q_1}{(H_0(b) + \alpha q_0) + (H_1(b) + \alpha q_1)},$$

Wherein q0 and q1 comprise values determined from the mode information associated with the neighboring blocks to the block, b comprises a detail metric, H0(b) comprises a first probability value for the detail metric, H1(b) comprises a second probability value for the detail metric, and α comprises a weighting factor.

2. The method of claim 1, wherein the block comprises a 16 pixel by 16 pixel macroblock.

3. The method of claim 1, wherein the multimedia coding modes define granularity of the block in terms of partitions, sub-partitions, or partitions and sub-partitions.

4. The method of claim 1, wherein selecting from at least two sets of possible multimedia coding modes comprises selecting between a set of inter-planar modes and a set of inter-detail modes.

5. The method of claim 4, wherein the inter-planar modes comprise an inter 16 by 16 mode, an inter 16 by 8 mode and an inter 8 by 16 mode; and wherein the inter-detail modes comprise an inter 8 by 8 mode, an inter 8 by 4 mode, an inter 4 by 8 mode, and an inter 4 by 4 mode.

6. The method of claim 1, wherein the multimedia frame is part of a sequence of multimedia frames, each multimedia frame comprising a plurality of blocks, and the method further comprising preprocessing the sequence of multimedia frames, prior to the selecting, to determine a detail metric for each block in the sequence of multimedia frames.

7. The method of claim 1, further comprising updating statistics in the one or more probability equations for mode selection decisions of subsequent blocks of the frame of the multimedia sequence.

8. The method of claim 1, wherein the detail metric is indicative of temporal and spatial detail in the block.

9. The method of claim 1, wherein the mode information associated with the neighboring blocks to the block is defined by a first sub-set of blocks within the frame and a second sub-set of blocks within a different frame.

10. The method of claim 9, further comprising weighting the first sub-set of blocks within the frame differently than the second sub-set of blocks within the different frame.

11. The method of claim 1, further comprising selecting a mode for coding the block from the selected set of possible multimedia coding modes.

12. The method of claim 11, further comprising avoiding motion searches associated with modes for the block in a non-selected set of multimedia coding modes.

13. An apparatus for processing multimedia data comprising:
an encoder that selects a set of multimedia coding modes from at least two sets of possible multimedia coding modes for a block of a multimedia frame based on one or more probability equations that include variables corresponding to mode information associated with neighboring blocks to the block, the probability equations including at least one of;

$$h_0 = \frac{H_0(b) + \alpha q_0}{(H_0(b) + \alpha q_0) + (H_1(b) + \alpha q_1)},$$

OR $$h_1 = \frac{H_1(b) + \alpha q_1}{(H_0(b) + \alpha q_0) + (H_1(b) + \alpha q_1)},$$

Wherein q0 and q1 comprise values determined from the mode information associated with the neighboring blocks to the block, b comprises a detail metric, H0(b) comprises a first probability value for the detail metric, H1(b) comprises a second probability value for the detail metric, and α comprises a weighting factor.

14. The apparatus of claim 13, wherein the block comprises a 16 pixel by 16 pixel macroblock.

15. The apparatus of claim 13, wherein the multimedia coding modes define a granularity of the block in terms of partitions, sub-partitions, or partitions and sub-partitions.

16. The apparatus of claim 13, wherein the encoder selects from at least two sets of possible multimedia coding modes by selecting between a set of inter-planar modes and a set of inter-detail modes.

17. The apparatus of claim 13, wherein the one or more probability equations comprise the detail metric and the mode information associated with the neighboring blocks as variables.

18. The apparatus of claim 17, wherein the encoder updates statistics in the one or more probability equations for mode selection decisions of subsequent blocks of the frame of the multimedia sequence.

19. The apparatus of claim 13, wherein the mode information associated with the neighboring blocks to the block is defined by a first sub-set of blocks within the frame and a second sub-set of blocks within a different frame.

20. The apparatus of claim 19, wherein the encoder weights the first sub-set of blocks within the frame differently than the second sub-set of blocks within the different frame.

21. The apparatus of claim 13, wherein the encoder selects a mode for coding the block from the selected set of possible multimedia coding modes.

22. The apparatus of claim 21, wherein the encoder avoids motion searches associated with modes for the block in a non-selected set of multimedia coding modes.

23. A processor implemented in hardware for processing multimedia data, the processor being configured to:
select a set of multimedia coding modes from at least two sets of possible multimedia coding modes for a block of a multimedia frame based on one or more probability equations that include variables corresponding to mode information associated with neighboring blocks to the block, the probability equations including at least one of;

$$h_0 = \frac{H_0(b) + \alpha q_0}{(H_0(b) + \alpha q_0) + (H_1(b) + \alpha q_1)},$$
OR
$$h_1 = \frac{H_1(b) + \alpha q_1}{(H_0(b) + \alpha q_0) + (H_1(b) + \alpha q_1)},$$

Wherein q0 and q1 comprise values determined from the mode information associated with the neighboring blocks to the block, b comprises a detail metric, H0(b) comprises a first probability value for the detail metric, H1(b) comprises a second probability value for the detail metric, and $\alpha$ comprises a weighting factor.

24. The processor of claim 23, wherein the block comprises a 16 pixel by 16 pixel macroblock.

25. The processor of claim 23, wherein the multimedia coding modes define a granularity of the block in terms of partitions, sub-partitions, or partitions and sub-partitions.

26. The processor of claim 23, wherein the processor is configured to select from at least two sets of possible multimedia coding modes by selecting between a set of inter-planar modes and a set of inter-detail modes.

27. The processor of claim 23, wherein the multimedia frame is part of a sequence of multimedia frames, each multimedia frame comprising a plurality of blocks, and the processor is further configured to preprocess the sequence of multimedia frames, prior to the selecting, to determine a detail metric for each block in the sequence of multimedia frames.

28. The processor of claim 23, wherein the processor is configured to update statistics in the one or more probability equations for mode selection decisions of subsequent blocks of the frame of the multimedia sequence.

29. A non-transitory machine-readable medium comprising:
instructions for processing multimedia data that upon execution cause a machine to perform a method comprising:
pre-processing a sequence of multimedia frames, each multimedia frame comprising a plurality of blocks; and
selecting a set of multimedia coding modes from at least two sets of possible multimedia coding modes for one of the plurality of blocks of one of the plurality of multimedia frames based on one or more probability equations that include variables corresponding to mode information associated with neighboring blocks to the one of the plurality of blocks, the probability equations including at least one of;

$$h_0 = \frac{H_0(b) + \alpha q_0}{(H_0(b) + \alpha q_0) + (H_1(b) + \alpha q_1)},$$
OR
$$h_1 = \frac{H_1(b) + \alpha q_1}{(H_0(b) + \alpha q_0) + (H_1(b) + \alpha q_1)},$$

Wherein q0 and q1 comprise values determined from the mode information associated with the neighboring blocks to the block, b comprises a detail metric, H0(b) comprises a first probability value for the detail metric, H1(b) comprises a second probability value for the detail metric, and $\alpha$ comprises a weighting factor.

30. The machine-readable medium of claim 29, wherein the multimedia coding modes define a granularity of the block in terms of partitions, sub-partitions, or partitions and sub-partitions.

31. The machine-readable medium of claim 29, wherein the selecting from the at least two sets of possible multimedia coding modes further comprises selecting between a set of inter-planar modes and a set of inter-detail modes.

32. The machine-readable medium of claim 29, wherein the one or more probability equations comprise the detail metric and the mode information associated with the neighboring blocks as variables.

33. The machine-readable medium of claim 32, wherein the method further comprising updating update statistics in the one or more probability equations for mode selection decisions of subsequent blocks of the frame of the multimedia sequence.

34. An apparatus for processing multimedia data comprising:
means for selecting a set of multimedia coding modes from at least two sets of possible multimedia coding modes for a block of a multimedia frame based on one or more probability equations that include variables corresponding to mode information associated with neighboring blocks to the block, the probability equations including at least one of;

$$h_0 = \frac{H_0(b) + \alpha q_0}{(H_0(b) + \alpha q_0) + (H_1(b) + \alpha q_1)},$$
OR
$$h_1 = \frac{H_1(b) + \alpha q_1}{(H_0(b) + \alpha q_0) + (H_1(b) + \alpha q_1)},$$

Wherein q0 and q1 comprise values determined from the mode information associated with the neighboring blocks to the block, b comprises a detail metric, H0(b) comprises a first probability value for the detail metric, H1(b) comprises a second probability value for the detail metric, and $\alpha$ comprises a weighting factor.

35. The apparatus of claim 34, wherein the multimedia coding modes define a granularity of the block in terms of partitions, sub-partitions, or partitions and sub-partitions.

36. The apparatus of claim 34, wherein the means selects from at least two sets of possible multimedia coding modes by selecting between a set of inter-planar modes and a set of inter-detail modes.

37. The apparatus of claim 34, wherein the detail metric is indicative of a number of bits that the block needs in order to be encoded at a constant visual quality.

38. The apparatus of claim 34, further comprising means for updating statistics in the one or more probability equations for mode selection decisions of subsequent blocks of the frame of the multimedia sequence.

39. The method of claim 1, wherein the detail metric is indicative of a number of bits that the block needs in order to be encoded at a constant visual quality.

40. The method of claim 1, wherein the one or more probability equations comprise the detail metric and the mode information associated with the neighboring blocks as variables.

41. The apparatus of claim 13, wherein the detail metric is indicative of a number of bits that the block needs in order to be encoded at a constant visual quality.

42. The apparatus of claim 13, wherein the multimedia frame is part of a sequence of multimedia frames, each multimedia frame comprising a plurality of blocks, and the method further comprising preprocessing the sequence of multimedia frames, prior to the selecting, to determine a detail metric for each block in the sequence of multimedia frames.

43. The apparatus of claim 13, wherein the detail metric is indicative of temporal and spatial detail in the block.

44. The apparatus of claim 16, wherein the inter-planar modes comprise an inter 16 by 16 mode, an inter 16 by 8 mode and an inter 8 by 16 mode; and wherein the inter-detail modes comprise an inter 8 by 8 mode, an inter 8 by 4 mode, an inter 4 by 8 mode, and an inter 4 by 4 mode.

45. The processor of claim 23, wherein the detail metric is indicative of a number of bits that the block needs in order to be encoded at a constant visual quality.

46. The processor of claim 26, wherein the inter-planar modes include an inter 16 by 16 mode, an inter 16 by 8 mode and an inter 8 by 16 mode; and wherein the inter-detail modes include an inter 8 by 8 mode, an inter 8 by 4 mode, an inter 4 by 8 mode, and an inter 4 by 4 mode.

47. The processor of claim 23, wherein the one or more probability equations comprise the detail metric and the mode information associated with the neighboring blocks as variables.

48. The processor of claim 23, wherein the detail metric is indicative of temporal and spatial detail in the block.

49. The processor of claim 23, wherein the mode information associated with the neighboring blocks to the block is defined by a first sub-set of blocks within the frame and a second sub-set of blocks within a different frame.

50. The processor of claim 49, further comprising weighting the first sub-set of blocks within the frame differently than the second sub-set of blocks within the different frame.

51. The processor of claim 23, further comprising selecting a mode for coding the block from the selected set of possible multimedia coding modes.

52. The processor of claim 51, further comprising avoiding motion searches associated with modes for the block in a non-selected set of multimedia coding modes.

53. The machine-readable medium of claim 29, wherein the block comprises a 16 pixel by 16 pixel macroblock.

54. The machine-readable medium of claim 29, wherein the detail metric is indicative of a number of bits that the block needs in order to be encoded at a constant visual quality.

55. The machine-readable medium of claim 31, wherein the inter-planar modes include an inter 16 by 16 mode, an inter 16 by 8 mode and an inter 8 by 16 mode; and wherein the inter-detail modes include an inter 8 by 8 mode, an inter 8 by 4 mode, an inter 4 by 8 mode, and an inter 4 by 4 mode.

56. The machine-readable medium of claim 29, wherein the detail metric is indicative of temporal and spatial detail in the block.

57. The machine-readable medium of claim 29, wherein the mode information associated with the neighboring blocks to the block is defined by a first sub-set of blocks within the frame and a second sub-set of blocks within a different frame.

58. The machine-readable medium of claim 57, further comprising weighting the first sub-set of blocks within the frame differently than the second sub-set of blocks within the different frame.

59. The machine-readable medium of claim 29, further comprising selecting a mode for coding the block from the selected set of possible multimedia coding modes.

60. The machine-readable medium of claim 59, further comprising avoiding motion searches associated with modes for the block in a non-selected set of multimedia coding modes.

61. The machine-readable medium of claim 29, wherein the multimedia frame is part of a sequence of multimedia frames, each multimedia frame comprising a plurality of blocks, and the preprocessing the sequence of multimedia frames further comprises preprocessing the sequence of multimedia frames, prior to the selecting, to determine a detail metric for each block in the sequence of multimedia frames.

62. The apparatus of claim 34, wherein the block comprises a 16 pixel by 16pixel macroblock.

63. The apparatus of claim 36, wherein the inter-planar modes include an inter 16 by 16 mode, an inter 16 by 8 mode and an inter 8 by 16 mode; and wherein the inter-detail modes include an inter 8 by 8 mode, an inter 8 by 4 mode, an inter 4 by 8 mode, and an inter 4 by 4 mode.

64. The apparatus of claim 34, wherein the detail metric is indicative of temporal and spatial detail in the block.

65. The apparatus of claim 34, wherein the mode information associated with the neighboring blocks to the block is defined by a first sub-set of blocks within the frame and a second sub-set of blocks within a different frame.

66. The apparatus of claim 65, further comprising weighting the first sub-set of blocks within the frame differently than the second sub-set of blocks within the different frame.

67. The apparatus of claim 34, further comprising selecting a mode for coding the block from the selected set of possible multimedia coding modes.

68. The apparatus of claim 67, further comprising avoiding motion searches associated with modes for the block in a non-selected set of multimedia coding modes.

69. The apparatus of claim 34, wherein the multimedia frame is part of a sequence of multimedia frames, each multimedia frame comprising a plurality of blocks, and the method further comprising preprocessing the sequence of multimedia frames, prior to the selecting, to determine a detail metric for each block in the sequence of multimedia frames.

70. The apparatus of claim 34, wherein the one or more probability equations comprise the detail metric and the mode information associated with the neighboring blocks as variables.

* * * * *